United States Patent [19]

Babcock et al.

[11] Patent Number: 4,781,733
[45] Date of Patent: Nov. 1, 1988

[54] SEMIPERMEABLE THIN-FILM MEMBRANES COMPRISING SILOXANE, ALKOXYSILYL AND ARYLOXYSILYL OLIGOMERS AND COPOLYMERS

[75] Inventors: Walter C. Babcock; Dwayne T. Friesen, both of Bend, Oreg.

[73] Assignee: Bend Research, Inc., Bend, Oreg.

[21] Appl. No.: 74,247

[22] Filed: Jul. 16, 1987

Related U.S. Application Data

[63] Continuation-in-part of Ser. No. 888,229, Jul. 23, 1986, abandoned.

[51] Int. Cl.$^4$ .............................................. B01D 53/22
[52] U.S. Cl. ................................................ 55/16; 55/68; 55/73; 55/158
[58] Field of Search ..................... 55/16, 68, 158, 73

[56] References Cited

U.S. PATENT DOCUMENTS

| Re. 30,351 | 7/1980 | Hoehn et al. ............... 55/16 |
| 3,709,774 | 1/1973 | Kimura ....................... 55/16 X |
| 4,134,743 | 1/1979 | Macriss et al. ............. 55/34 |
| 4,174,955 | 11/1979 | Blackmer et al. .......... 55/16 X |
| 4,192,842 | 3/1980 | Kimura et al. ............. 55/16 |
| 4,203,463 | 5/1980 | Henis et al. ................ 55/16 |
| 4,214,020 | 7/1980 | Ward et al. ................. 55/158 X |
| 4,243,701 | 1/1981 | Riley et al. ................. 55/158 X |
| 4,444,662 | 4/1984 | Conover .................... 55/16 X |
| 4,470,831 | 9/1984 | Hirose ....................... 55/158 |
| 4,493,714 | 1/1985 | Ueda et al. ................. 55/16 |
| 4,527,999 | 7/1985 | Lee ............................ 55/16 |
| 4,565,846 | 1/1986 | Saito et al. ................. 55/158 X |
| 4,613,440 | 9/1986 | Zupancic et al. .......... 55/158 X |

FOREIGN PATENT DOCUMENTS

| 107636 | 5/1984 | European Pat. Off. ........ 55/158 |
| 55007 | 4/1983 | Japan ............................ 55/158 |
| 92420 | 6/1983 | Japan ............................ 55/158 |
| 95539 | 6/1983 | Japan ............................ 55/158 |
| 95540 | 6/1983 | Japan ............................ 55/158 |
| 193701 | 11/1983 | Japan ............................ 55/158 |
| 49803 | 3/1984 | Japan ............................ 55/158 |
| 49804 | 3/1984 | Japan ............................ 55/158 |
| 49805 | 3/1984 | Japan ............................ 55/158 |
| 59221 | 4/1984 | Japan ............................ 55/158 |
| 189904 | 10/1984 | Japan ............................ 55/158 |

OTHER PUBLICATIONS

Henis et al., 8 *J. Membrane Sci* 233 (1981).
9 J. Membrane Sci 121 (1981), Strathman.
Cadotte, et al., "Thin Film Composite Reverse-Osmosis Membranes: Origin, Development, and Recent Advances," in vol. I of Synthetic Membranes, ACS Symposium Series 153 (1981).

*Primary Examiner*—Robert Spitzer
*Attorney, Agent, or Firm*—Chernoff, Vilhauer, McClung & Stenzel

[57] ABSTRACT

Novel semiperimeable membranes and thin film composite (TFC) gas separation membranes useful in the separation of oxygen, nitrogen, hydrogen, water vapor, methane, carbon dioxide, hydrogen sulfide, lower hydrocarbons, and other gases are disclosed. The novel semipermeable membranes comprise the polycondensation reaction product of two complementary polyfunctional compounds, each having at least two functional groups that are mutually reactive in a condensation polymerization reaction, and at least one of which is selected from siloxanes, alkoxsilyls and aryloxysilyls. The TFC membrane comprises a microporous polymeric support, the surface of which has the novel semipermeable film formed thereon, preferably by interfacial polymerization.

32 Claims, No Drawings

4,781,733

SEMIPERMEABLE THIN-FILM MEMBRANES COMPRISING SILOXANE, ALKOXYSILYL AND ARYLOXYSILYL OLIGOMERS AND COPOLYMERS

The government has rights in this invention pursuant to Contract No. DE-AC03-84ER80159 awarded by the Department of Energy.

This is a continuation-in-part of Application Ser. No. 888,229, filed July 23, 1986, now abandoned.

BACKGROUND OF THE INVENTION

Gas separation by membranes is known and comprises a very efficient chemical process technology. For example, there is currently substantial commercial interest in the use of semipermeable membranes for the removal of gases regarded to be impurities from hydrocarbon gases, such as the acid gases $H_2S$ and $CO_2$ from natural gas, coal gases, landfill gases and refinery gases. Other examples include the separation and recovery of hydrogen and hydrocarbons in refineries and the recovery of oxygen-enriched and nitrogen-enriched air.

Notwithstanding such recognized interest in gas separation by semipermeable membranes, owing to the state of the art of such membranes, namely, their relatively low flux as to desired gas species and relatively great thickness, the capital cost of a membrane gas separation plant currently tends to be prohibitive. There is therefore a great need in the art for efficient, effectively thin, semipermeable membranes that are inexpensive to make.

A number of techniques for the manufacture of such membranes are known. Asymmetric memhranes having a very thin permselective "skin" layer atop a much thicker microporous sublayer have been prepared from polysulfone and poly(2,6-dimethyl)phenylene oxide by a modified Loeb-Sourirajan phase inversion technique, as disclosed in U.S. Pat. No. 3,709,774. However, there are two principal problems with such membranes: (1) it is often difficult to control the casting process to produce the desired membrane morphology—namely, a membrane with a skin that is non-porous and yet thin enough to be useful; and (2) phase-inversion solvent systems and casting procedures have not been identified for many of the membrane polymers of interest. The first problem—that the nominally dense skin layers of assymmetric membranes typically exhibit surface porosities in the parts-per-million range that compromise selectivity—can be dealt with for at least certain types of asymmetric membranes such as polysulfone by physically coating them with high-permeability elastomers that serve to fill surface pores and defects. See Henis et al., 8 *J. Membrane Sci.* 233 (1981) and U.S. Pat. No. 4,203,463. In this fashion, the intrinsic gas permeability properties of the so-coated asymmetric substrate may be enhanced. But this improvement is at the same time an inherent limitation in that the membrane's gas permeability properties are derived primarily from the substrate. Even with this improvement, the second limitation of asymmetric membranes mentioned above remains: the number of polymers from which asymmetric membranes can be made is limited.

One approach for obtaining asymmetric skinned membranes with improved gas permeation properties involves treating fabricated membranes, while under onesided constraint, with a swelling agent or solvent mixture so as to cause a collapse of the small pores of the top skin of the asymmetric membrane. See U.S. Pat. No. 4,527,999. However, such a technique is not commercially feasible since the process conditions are too critical.

Another method for preparing ultrathin films involves the creation of a two-layer structure in which a thin and selective film is supported by a microporous backing. The backing is made sufficiently porous so as to minimize its flow resistance, while its pores are made sufficiently small that the burst strength of the thin membrane is not exceeded where it spans the mouth of a pore. Perhaps the simplest method for preparing coated films involves casting a thin layer of polymer solution directly atop a microporous support and then allowing the solvent to evaporate, as described in U.S. Pat. No. 4,134,743 and 9 *J. Membrane Sci.* 121 (1981). This technique suffers from several drawbacks, the most serious of which is the matter of controlling the coating and penetration processes with sufficient precision so as to guarantee the production of uniformly thin yet defect-free coatings. U.S. Pat. No. 4,243,701 discloses a variation of this procedure wherein one surface of a microporous support membrane is dip-coated with a homogeneous solution containing a prepolymer and a crosslinking agent; the latter are subsequently reacted at elevated temperature. Silicone coatings as thin as a few microns may be prepared in this manner.

Still other efforts at fabricating a semipermeable thin-film composite membrane utilize reverse osmosis (RO)-type technology such as water- or fluid-casting. The primary disadvantage of water casting as applied to the production of ultrathin gas-separation membranes is its cost. Water casting is a delicate, multi-step, and labor-intensive procedure that demands considerable skill and dexterity on the part of the technician and that is best performed under clean-room conditions. As a result, it has been applied commercially only on a relatively small scale, e.g., in the manufacture of membrane oxygen enrichers for home medical oxygen therapy. See U.S. Pat. No. 4,174,955.

None of the foregoing techniques lends itself to the production of efficient, inexpensive membranes needed to reduce the capital cost of a large scale membrane gas separation plant.

The preparation of RO desalination membranes by interfacial polymerization (IP) is known. See Cadotte et al., "Thin-Film Composite Reverse-Osmosis Membranes: Origin, Development, and Recent Advances," in Vol. I of *Synthetic Membranes,* ACS Symposium Series 153 (1981). Such membranes comprise an ultrathin layer of permselective polymer supported by a microporous membrane made of a different material. The ultrathin separating layer of the thin-film composite (TFC) used in RO is on the order of several hundred to several thousand angstrom units thick, and because of this, TFC membranes exhibit high water fluxes in RO applications. In interfacial polymerization, a microporous support membrane (typically, polysulfone) is first impregnated with an aqueous solution of a multifunctional reagent (e.g., a polyamine), and then immersed in an immiscible solvent containing a crosslinking agent. Polymerization occurs rapidly at the solution interface to form the thin film that serves as the permselective layer. The continuous film that is formed acts as a barrier that retards further contact of the reacting species. This self-limiting process accounts for the excedingly thin permselective films that are obtainable.

IP techniques have recently been applied to the development of TFC gas separation membranes. See U.S. Pat. No. 4,493,714 which discloses composite membranes especially useful for separating oxygen and nitrogen, the membrane being formed by interfacial polymerization of a silicon-containing polyamine and a polyisocyanate or a polyamine and a silicon-containing polyisocyanate on a microporous support to form a silicon-containing ultrathin polyurea film on the support. However, this patent does not disclose membranes useful for other gas separations of interest, such as carbon dioxide and hydrogen sulfide from methane and low molecular weight ($C_2$–$C_4$) hydrocarbons and does not disclose any polycondensation membranes other than polyureas.

SUMMARY OF THE INVENTION

There are essentially two aspects to the present invention. One aspect comprises novel semipermeable thin-film membranes of siloxane-, alkoxysily-land aryloxysilyl-containing oligomers and copolymers; and the other aspect comprises a TFC membrane composed of a thin film of such oligomers and copolymers formed on and into the surface of a microporous polymeric support. In many cases, the thin film may be covalently bonded to the support. The novel oligomers and copolymers comprise the condensation reaction product of two polyfunctional monomers or prepolymers, each of the two having two or more functional groups that are mutually reactive in a condensation reaction. The two polyfunctional monomers or prepolymers are complementary in that they are polycondensable with each other, with at least one of them being selected siloxanes, alkoxysilyls and aryloxysilyls. Rather surprisingly, the semipermeable thin-film membranes of the present invention take on the best properties of siloxane, alkoxysilyl, and aryloxysilyl polymers (high permeability), at the same time taking on the best properties of the polycondensation polymers (high selectivity). This is unexpected since, in general, high permeability and high selectivity are mutually exclusive. In addition, copolymers usually have properties that tend to be an average of the respsective constituent polymers. The thin film of the TFC membrane comprises the novel polymeric condensation (polycondensation) reaction product, whereby the functional groups on the two prepolymers undergo a condensation reaction to form condensation reaction product linkages therebetween, creating a film on a polymeric support. This film may be made extremely thin by the method of interfacial polymerization, that is, by allowing it to form at the interface between two immiscible phases—one that contains one of the prepolymer components and the other that contains the other complementary prepolymer component. Such TFC membranes are inexpensive to make, have high flux rates and permeability, and are extremely selective in the separation of the acid gases carbon dioxide and hydrogen sulfide from methane and other lower hydrocarbons, hydrogen from methane and other lower hydrocarbons, hydrogen from nitrogen, and oxygen from nitrogen, making feasible their use in membrane gas separation plants. Such TFC membranes have also been found to be extremely useful for the separation of water vapor from gases, especially from air.

DETAILED DESCRIPTION OF THE INVENTION

The semipermeable membranes of the present invention may be prepared by reacting (1) at least one polyfunctional monomeric or oligomeric ("prepolymeric") siloxane, alkoxysilyl, or aryloxysilyl with (2) a complementary prepolymeric polyfunctional compound that is polycondensable with the other prepolymeric compound, each of the two prepolymers having at least two functional groups selected from the two groups of functionalities that are mutually reactive in a condensation polymerization reaction, shown below:

| Group A | Group B |
|---|---|
| —COX | —$NHR_h$ |
| —$SO_2$X | —OH |
| —NCO | —SH |
| —$POXR_o$ | |
| —$NR_h$COX | | where X is halide; $R_o$ is selected from alkyloxy and substituted alkyloxy containing 1 to 18 carbons in the carbon chain, alkyl and substituted alkyl containing from 1 to 18 carbons in the carbon chain, cycloakyl, substituted cycloalkyl, and substituted heterocycloalkyl, aryl and substituted aryl; $R_h$ is selected from hydrogen and $R_o$; provided that when at least two functional groups are selected from Group A for one of the two compounds, at least two complementary, mutually reactive functional groups are selected from Group B for the other of the two compounds, and vice-versa. All of the functional groups in the two Groups A and B may be pendant in a substituted or unsubstituted hydrocarbon moiety selected from an aliphatic, heteroaliphatic, olefinic, heteroolefinic, cycloalphatic, heterocycloaliphatic or aromatic hydrocarbon moiety, while the —$POXR_o$, —$NR_h$COX, and —$NHR_h$ functional groups may be part of the heteroaliphatic, heteroolefinic or heterocycloaliphatic hydrocarbon moiety. The substituents on the hydrocarbon moieties may be virtually any substituent, including, but not limited to, lower alkyls, alkenes, aryls, halogens, amines, amides, ethers, esters, alcohols, acids, thio groups, thiols, siloxanes, ketones, sulfonate esters, pyrrolidones, and imines.

Suitable polyfunctional carbonyl halides containing the functional group —COX include dicarbonyl halides, tricarbonyl halides and other multifunctional carbonyl halides, all having at least two carbonyl halides. A representative, but not exhaustive, list includes the siloxanes 1,3-di(3-chlorocarbonylpropyl)tetramethyldisiloxane, 1,3-di(1,1,2trimethyl-2- chlorocarbonylpropyl) hexamethyltrisiloxane, 1,9-di(1,1,2-trimethyl-2-chlorocarbonylpropyl) -5-[3-(1,1,2-trimethyl-2-chlorocarbonylpropyltetramethyldisiloxy)]nonamethylpentasiloxane, 1,3,5-tri(chlorocarbonyl)pentamethyltrisiloxane, and 1,3-di(3-chlorocarbonylpropyl)m-chlorobenzyltrimethyldisiloxane. disiloxane.

Suitable polyfunctional sulfonyl halides containing the functional group —$SO_2$X include such siloxanes as 1,3-di(chlorosulfonylmethyl)tetramethyldisiloxane, 1,3,5-tri(1,1,2-trimethyl-2-chlorosulfonylpropyl)pentamethyltrisiloxane, 3,5-di(2-chlorosulfonylethyl) -3-(2-diphenylphosphinoethyl)pentamethyltrisiloxane, 1,7-di(2-chlorosulfonylpropyl)octamethyltetrasiloxane, and 1,5-di(2-chlorosulfonylethyl)hexamethyltrisiloxane.

Suitable polyfunctional isocyanates containing the functional group —NCO include such siloxanes as 1,3-di(2-isocyanatopropyl)tetramethyldisiloxane, 1,3,5-tri(1-isocyanatoisopropyl)pentamethyltrisiloxane, 1,7-di(isocyanatomethyl)octamethyltetrasiloxane, 1,3-di(4- isocyanatophenylethyl)tetramethyldisiloxane, and 1,3,5-tri(2-isocyanatoethyl)pentamethyltrisiloxane.

Suitable polyfunctional phosphoryl halides containing the functional group —$POXR_o$ include such siloxanes as 1,3-di(ethylchlorophosphoryl)tetramethyldisiloxane, 1,7,13-tri(perfluorobenzylfluorophosphoryl)tridecamethylheptasiloxane, 1,3,5-tri(methylchlorophosphoryl)pentamethyltrisiloxane, 1,3-di(4-chlorobenzylchlorophosphoryl)tetramethyldisiloxane, and 1,5-di(cyclohexylfluorophosphoryl)hexamethyltrisiloxane.

Suitable polyfunctional amidocarbonyl halides containing the functional group —$NR_hCOX$ include such siloxanes as 1,7-di(chlorocarbonylethylamido)octamethyltetrasiloxane, 1,3,5-tri(fluorocarbonylperfluorocyclohexylamido)pentamethyltrisiloxane, 1,5,5,9-tetra(chlorocarbonylisopropylamido)octamethylpentasiloxane, 1,9-di(chlorocarbonylmethylamido-1-isopropyl)-5-[3-(chlorocarbonyl-tertbutylamido-2-ethyl)tetramethyldisiloxynonamethylpentasiloxane, and 1,3-di(chlorocarbonyltrifluoromethylamido)tetramethyldisiloxane.

Suitable polyfunctional amines containing the functional group —$NHR_h$ include diamines, triamines, polyethyleneimine and other multifunctional amines, all having at least two primary or secondary amine groups. A representative, but not exhaustive, list includes such siloxanes as 1,5-di(1,1,2-trimethyl-2-aminopropyl)hexamethyltrisiloxane, 1,3-di(2-aminopropyl)tetramethyldisiloxane, 1,3,5-tri(aminomethyl)pentamethyltrisiloxane, 4-(trimethylsiloxypropyl)diethylenetriamine(pendant siloxy), 2,4,6-triaminophenyl-tris(trimethylsiloxy)silane(pendant siloxy), 1,3,5-tri[(aminoethylaminomethyl)phenylethyl]pentamethyltrisiloxane, 1,5-di(4-amino-2,3,5,6tetrafluorophenyl) pentamethyl-3-(aminoethyl)trisiloxane, and 1,5-di(2-aminopropyl)pentamethyl-3-N-ethylenepyrrolidino)trisiloxane. When the TFC membrane of the present invention is prepared by interfacial polymerization, as outlined below, the amine must be water-soluble to the extent of at least 0.1 wt %.

Suitable polyfunctional alcohols containing hydroxyl functional groups include such siloxanes as 1,3-di(2-hydroxypropyl)tetramethyldisiloxane, 1,3,5-tri(2-hydroxyethyl)pentamethyltrisiloxane, 1,5-dihydroxymethyl-3-(diethylphosphatoethyl)pentamethyltrisiloxane, 1,9-di(1,1,2trimethyl-2-hydroxypropyl) -5-[3-(1,1,2-trimethyl-2-hydroxypropyl)tetramethyldisiloxy]-nonamethylpentasiloxane, and 1,3-dihydroxymethyltetramethyldisiloxane.

Suitable polyfunctional mercaptans (thiols) containing mercaptan functional groups include such siloxanes as 1,3-di(3-mercaptopropyl)tetramethyldisiloxane, 1,3,5-tri(mercaptomethyl)pentamethyltrisiloxane, 1,5-di(3-mercaptopropyl)-3-(p-fluorophenyl)pentamethyltrisiloxane, 1,7-di(2-mercaptopropyl) octamethyltetrasiloxane, and 1,9-di(3-mercaptobutyl) -5-[2-(3-mercaptopropyl)tetramethyldisiloxy]non-amethylpentasiloxane.

Suitable siloxane-based compounds include difunctional compounds or mixtures thereof of the structure I below:

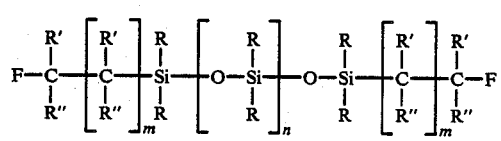

and trifunctional compounds or mixtures thereof of the structure II below:

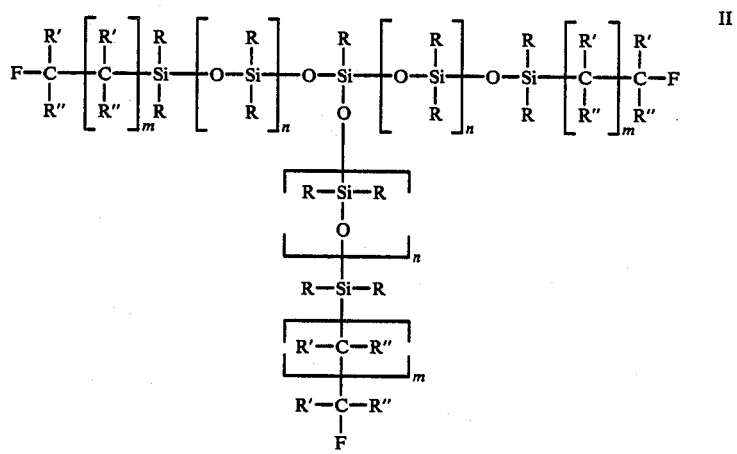

where F is a functional group selected from those in Group A or Group B above; R is lower alkyl (preferably 1 to 6 carbon atoms), halogen-substituted lower alkyl, or aryl; R' and R" are hydrogen or lower alkyl (preferably 1 to 5 carbon atoms); and m and n are zero or integers up to 500, preferably 5 to 100, and most preferably 5 to 75. When F on one siloxane is an acid halide and F on the other siloxane is an amine, the condensation reaction resulting in the formation of amide linkages, the crosslinking in the resulting novel polymer is believed to be of the structure III below:

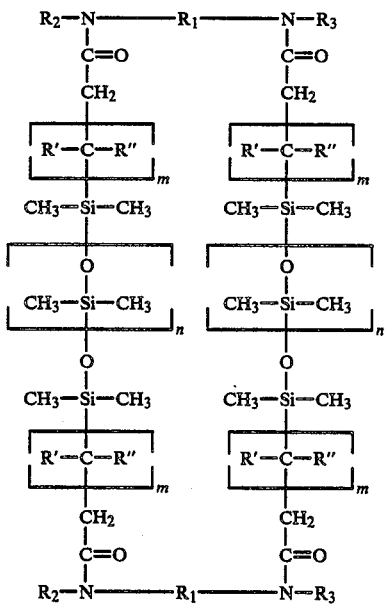

III

Suitable polyfunctional alkoxysilyls and aryloxysilyls include compounds or mixtures thereof of the structure IV below:

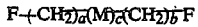

IV where F is a functional group selected from those in Group A or Group B above; M is selected from Y or Z or combinations thereof; a and b are numbers selected from zero and integers from 1 to 12; c is an integer from 1 to 20; Y and Z are of the structures shown below:

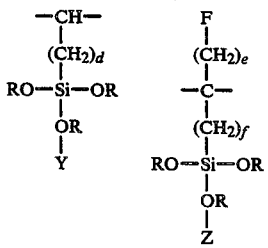

R is aryl or alkyl containing up to 10 carbon atoms; and d, e and f are numbers selected from zero and integers from 1 to 12.

A special case of such polyfunctional compounds is presented when the functional groups are non-terminal amines; in that case, the compounds are represented by structure V below.

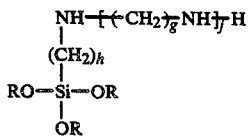

V where R is as defined for structure V; g an h are numbers selected from 0 and integers from 1 to 12; and j is an integer from 1 to 20.

The novel polymers of the present invention may be formed by virtually any method comprising a polyconensation reaction. Bulk polymer can be made, for example, by emulsion polymerization wherein a water-soluble polyfunctional siloxane, alkoxysilyl or aryloxysilyl is dissolved in water and the complementary polyfunctional compound is dissolved in a water-immiscible organic solvent such as hexane or toluene. The two phases are mixed to form an emulsion. The polymer forms at the water/organic solvent interfaces and precipitates from solution. The reaction is complete within 1 or 2 hours. The polymer is filtered out of the solution, washed with water, then with an alcohol such as isopropanol or ethanol, and then with hexane, and is finally either air dried at ambient conditions or heat cured for 10 to 60 minutes at 80° C. to 140° C.

Bulk polymer can also be made by the reaction of the polyfunctional compounds in a common solvent such as tetrahydrofuran (THF), N,N'-dimethylformamide (DMF), or dimethylacetamide (DMAc). Upon polymerization the polymer precipitates from solution. The polymer is then washed and dried or heat cured in the same manner described above.

The bulk polymer form of the novel polymers of the present invention may be used with or without a support. To be useful without a support, it is preferable to prepare the polymer in the form of a finely microporous dense skin with a relatively thick porous substructure—a so-called "skinned" membrane. This may be accomplished by dissolving the bulk polymer in a water-miscible solvent such as DMSO, DMF, THF, DMAc or dioxane, extruding the polymer solution as a film into a water bath, whereby the polymer precipitates into the desired form.

To prepare a composite membrane from the bulk polymer with a support, the bulk polymer is preferably dissolved in a volatile solvent such as acetone, THF, toluene or a chlorinated hydrocarbon such as methylene chloride or dichloroethane and then coated onto the support material by conventional techniques such as spraying, dipping or "kissing" with a rubber roller.

The term "microporous" as used herein in connection with the support membrane is intended to include polymeric materials with surface porosity such that the polymeric material has no intrinsic gasseparating ability, and generally includes membranes having surface pores 0.0003 to 10 microns in diameter. Although virtually any method of conducting a polycondensation reaction resulting in the formation of a thin film on the surface of a microporous support membrane will do, the TFC membrane of the present invention may be advantageously formed in the following manner. A microporous support membrane from 0.5 to 5 mils thick such as polysulfone, polyethersulfone, cellulose acetate, cellulose triacetate, cellulose butyrate, regenerated cellulose, polyvinylidene fluoride, polyetherimide, polyamide, polyethylene, polypropylene, polytetrafluoroethylene or nylon is first impregnated by immersion or spraying at ambient temperature with a solution containing from 0.1 to 10 wt %, preferably 1.0 wt %, of, for example, a polyfunctional siloxane of the type mentioned above.

The polyfunctional siloxane-impregnated support membrane is then immediately contacted by immersion or spraying with a 0.1 to 10 wt %, preferably about 1 to 2 wt %, solution of a complementary polyfunctional compound of the type mentioned above. Typically, one solution is aqueous and the other uses a solvent that is water-immiscible; in such cases, there is a solution interface, and polymerization occurs rapidly at the solution interface by the reaction of the mutually reactive functional groups to form the thin-film membrane that serves as a permselective layer. The film thus formed also acts as a barrier that retards further contact of the reacting species, thus keeping the film extremely thin, generally on the order of 0.2 to 1.0 micron in thickness. Unreacted materials are subsequently washed away with suitable solvents such as water, ethanol or isopropanol.

The TFC membrane thus formed has the thin semipermeable membrane bonded, often covalently, to the microporous support. Both the novel semipermeable membranes and the TFC membranes of the present invention are much more permeable to oxygen than to nitrogen, and are therefore useful in producing an oxygen-rich gas stream or a nitrogen-rich gas stream from air. They are also much more permeable to carbon dioxide and hydrogen sulfide than to methane and other lower alkane and alkene hydrocarbons ($C_2$ to $C_4$), and can therefore be used for removing carbon dioxide, hydrogen sulfide and other acid gases from hydrocarbon mixtures predominantly comprising such hydrocarbons containing from one to four carbon atoms, but which may contain minor amounts (less than 1%) of higher hydrocarbons containing up to eight carbon atoms. In refinery applications, the principal component of such hydrocarbon mixtures is methane, usually constituting 80 to 95%. The membranes of the present invention are therefore quite suitable for separating the noted acid gases from methane. They are more permeable to hydrogen than to such hydrocarbon mixtures and can therefore be used for hydrogen/hydrocarbon separations in refineries. They are more permeable to hydrogen than to nitrogen, and so are useful in separations of those two gases. Finally, they are extremely permeable to water vapor relative to other gases, especially air and methane, and so are very useful for the separation of water vapor from gases, especially the two mentioned. The extreme thinness of the gas-separating layer allows a much higher rate of transport than is possible with other types of membranes.

The form of the TFC membrane of the present invention may be in sheets, or hollow fibers, in each case the underlying microporous polymeric support defining the form and having the ultrathin IP reaction product coating on the surface thereof. In the case of hollow fibers, the IP coating may be on either the outside of the fiber or on the lumens, or internal bore thereof. In each case, the IP reaction product is formed in essentially the same manner described above, i.e., impregnating the desired surface of the support with a polyfunctional siloxane, alkoxysilyl or aryloxy-silyl solution, or with the other polycondensable compound followed by contact with a solution of the complementary polyfunctional compound.

Specific examples of various embodiments of the present invention follow.

EXAMPLE 1

Di-carboxypropylacid chloride-terminated poly(dimethylsiloxane) of structure II wherein m was 3 and n had an average value of 58 was synthesized by essentially three steps: (1) reacting cyclic siloxane monomer, which forms the main polymer backbone, with an end-blocker to produce a cyanopropyl end-blocked poly(dimethlsiloxane); (2) hydrolyzing the cyano groups to form the carboxyacid chloride-terminated precursor; and (3) converting the carboxyl groups to acid halides with thionyl chloride. The particulars follow.

147.7 g of octamethylcyclotetrasiloxane, 8.9 g of 1,3-bis(3-cyanopropyl)-tetramethyldisiloxane and 4.0 g of Amberlyst 15 cation-exchange resin (made by Rohm & Haas of Philadelphia, Pa.) were combined in a 2-liter resin kettle equipped with an overhead stir motor and stirred overnight at 100° to 120° C. while maintaining a helium sparge. The Amberlyst resin was filtered off and rinsed with toluene. The filtered solution along with the toluene rinse were vacuum distilled at atmospheric pressure to remove the toluene. A vacuum of 100 mmHg was then applied at 80° C. to strip off the remaining unreacted octamethylcyclotetrasiloxane. The IR spectrum of the resulting product contained an absorption band between 2200 and 2260 $cm^{-1}$ which corresponds to the presence of nitrile groups as desired An equal volume of 5 vol % $H_2SO_4$ was added to the product of the first step in a 2-liter round bottom flask. It was heated and refluxed for 72 hours. The 5 vol % $H_2SO_4$ aqueous phase was removed and replaced with an equal volume of 40 vol % trifluoroacetic acid and 200 ml of toluene. The solution was washed three times with water in a separatory funnel and dried over anhydrous $MgSO_4$ for several hours. The $MgSO_4$ was removed by vacuum filtration. The toluene was removed by vacuum distillation. The IR spectrum of the product showed a strong peak at 1700 to 1725 $cm^{-1}$, indicating the presence of the desired carboxylic acid groups.

In the final step, 20 ml of the carboxylic acid-containing product was added to 200 ml of thionyl chloride and refluxed in a 500 ml round bottom flask for 30 minutes. Thionyl chloride was removed by vacuum distillation using a microstill while the mixture was heated in a 40° C. water bath. The IR spectrum of the product indicated that the carboxylic acid groups were converted to acid chloride due to the disappearance of an absorption band at 1700 to 1725 $cm^{-1}$ and the appearance of a band at 1800 to 1825 $cm^{-1}$.

EXAMPLE 2

An asymmetric polyethersulfone (PES) membrane having surface pores about 0.0003 to 0.01 micron in diameter, internal pores 0.1 to 2 microns in diameter, and with relatively high gas permeability and low selectivity was used as a microporous support. A 20×15 cm dry sheet of this support was taped to a glass plate. A coating was applied to the support attached to the glass plate by immersing it in a tank containing hexane with 2 wt % di-carboxypropylacid chloride-terminated poly(dimethylsiloxane) (a silane acid chloride or SAC compound) prepared in essentially the same manner as that in Example 1. After 2 minutes the plate was removed from the hexane tank, briefly drained (about 5 seconds), and immersed in a second tank containing water with 0.5 wt % N-2-aminoethyl-3-aminopropyltrimethoxysilane (a silane amine compound), 0.5 wt % N,N,N', 2-pentamethyl-2,1-propanediamine, and 0.1 wt % surfactant (Iconal NP-9, sold by BASF Wyandotte Corp. of Wyandotte, Mich.). After a 2-minute reaction time, the plate and membrane were removed from the second tank, drained, and allowed to air dry for 2 hours. The membrane was then heat-cured in an oven at 110° C. for 10 minutes.

The gas-permeation properties of this membrane were tested at room temperature and at 100 psig of oxygen, nitrogen, methane, and carbon dioxide. Pressure-normalized fluxes were 0.35 for oxygen, 0.07 for nitrogen, 0.12 for methane, and 0.30 for carbon dioxide, all measured in units of SCFH/ft$^2$-100 psi. The selectivity (ratio of fluxes) of the membrane toward oxygen over nitrogen was 4.9 and toward carbon dioxide over methane was 11.

EXAMPLES 3-7

TFC membranes of the present invention were prepared in five different batches in the same manner with the same reactants, and with the same microporous polymeric support as those in Example 2, varying the wt % ratios of siloxane-acid chloride compound (SAC) to silane-amine compound (SAM) as noted. Such membranes were then tested for gas permeability in the same fashion as those in Example 2. The results are reported in Table I.

TABLE I

| Membrane/Batch | Gas Flux (SCFH/ft$^2$-100 psi) | | | | Selectivity | |
|---|---|---|---|---|---|---|
| | $O_2$ | $N_2$ | $CO_2$ | $CH_4$ | $O_2/N_2$ | $CO_2/CH_4$ |
| Example 3 | | | | | | |
| 2 wt % SAC:0.2 wt % SAM | 0.41 | 0.12 | 1.17 | 0.20 | 3.4 | 6.0 |
| standard deviation | 0.05 | 0.02 | 0.29 | 0.03 | 0.3 | 1.4 |
| Example 4 | | | | | | |
| 2 wt % SAC:0.1 wt % SAM | 0.74 | 0.26 | 2.31 | 0.52 | 2.9 | 4.6 |
| standard deviation | 0.06 | 0.04 | 0.36 | 0.07 | 0.5 | 1.1 |
| Example 5 | | | | | | |
| 2 wt % SAC:0.05 wt % SAM | 0.39 | 0.20 | 0.91 | 0.27 | 2.0 | 3.8 |
| standard deviation | 0.14 | 0.12 | 0.05 | 0.08 | 0.4 | 0.9 |
| Example 6 | | | | | | |
| 2 wt % SAC:0.5 wt % SAM | 0.65 | 0.33 | 1.7 | 0.59 | 2.0 | 3.2 |
| standard deviation | 0.31 | 0.18 | 0.7 | 0.37 | 0.5 | 1.0 |
| Example 7 | | | | | | |
| 2 wt % SAC:0.1 wt % SAM | 1.15 | 0.54 | 3.10 | 0.95 | 2.2 | 3.4 |
| standard deviation | 0.26 | 0.15 | 0.70 | 0.23 | 0.2 | 0.3 |

EXAMPLE 8

The SAC compound of Example 1 was prepared in a slightly different manner than in Example 1, yielding a polymer with an average of 60 siloxane units between the carboxypropyl end groups.

296.6 g of octamethylcyclotetrasiloxane, 19.2 g of 1,3-bis(3-carboxypropyl)tetramethyldisiloxane and 8.0 g of Amberlyst 15 cation exchange resin were combined in a 1-liter, round bottom, three-neck flask and magnetically stirred in a 110° C. oil bath for about 16 hours while maintaining a nitrogen purge. The solution was cooled, and the Amberlyst resin filtered off and rinsed with hexane. The filtered solution along with the hexane rinse were then washed with 1.0 M $H_2SO_4$ and dried with anhydrous $MgSO_4$. Hexane was removed from the polymeric product by distillation at 0.1 to 1.0 mm Hg. The product, a slightly yellow viscous liquid, revealed an IR spectrum having strong absorption at 1720 cm$^{-1}$, corresponding to the presence of carboxylic acid groups.

This product was then converted to the acid chloride by refluxing 20 g of the same with 150 ml of an oxalyl chloride solution for 24 hours while magnetically stirring it. The oxalyl chloride was removed by distillation, followed by a vacuum distillation at about 1 mm Hg and 70° C. to remove additional volatile impurities. The IR spectrum of the product showed strong absorption at 1805 cm$^{-1}$ and very little absorption at 1720 cm$^{-1}$, indicating conversion of the carboxylic acid groups to acid chlorides.

EXAMPLES 9-16

Eight additional batches of TFC membranes were prepared with cellulose acetate microporous polymeric supports having intrinsic pressure-normalized fluxes for $CO_2$ of 30 to 60 SCFH/ft$^2$-100 psi and $CO_2/CH_4$ selectivities of 0.6 to 1.5 by polycondensing the amine compounds noted in Table II with the same siloxane-acid chloride compound (SAC) of Example 8. The method of preparing the membranes follows. A 4×6-inch piece of asymmetric support was secured to a glass plate with the "skin" side up. The plate and support were then immersed in a hexane solution of the SAC compound, and, after 2 minutes, removed, drained for 15 seconds, and sprayed with a fine mist of an aqueous solution of the SAM compound, the SAM solution also containing 0.1 wt % surfactant of the type noted in Example 2. The resulting TFC membranes were air-dried at 25° C. for a minimum of 2 hours, and then tested as in Example 2. The results are shown in Table II.

TABLE II

| Example No. | Amine Name | Amine (wt %) | SAC (wt %) | Flux (SCFH/ft$^2$-100 psi) | | | | Selectivity | |
|---|---|---|---|---|---|---|---|---|---|
| | | | | $CO_2$ | $CH_4$ | $O_2$ | $N_2$ | $CO_2/CH_4$ | $O_2/N_2$ |
| 9 | PEI[a] | 0.5 | 0.5 | 19.1 | 0.80 | 2.1 | 0.53 | 24 | 4.1 |
| 10 | A0700[b] | 0.1 | 0.5 | 15.0 | 0.45 | 1.6 | 0.32 | 33 | 5.0 |
| 11 | T2910[c] | 0.1 | 0.5 | 19.0 | 0.61 | 2.1 | 0.43 | 31 | 4.9 |
| 12 | T2910 | 1.0 | 0.5 | 18.0 | 0.50 | 2.0 | 0.37 | 36 | 5.4 |
| 13 | T2910 | 0.1 | 0.1 | 29.0 | 0.93 | 3.9 | 0.83 | 31 | 4.7 |
| 14 | T2910 | 0.1 | 0.1 | 32.0 | 0.94 | 3.3 | 0.66 | 34 | 5.0 |
| 15 | T2910 | 0.1 | 0.1 | 34.0 | 1.61 | 4.3 | 1.26 | 21 | 3.4 |
| 16 | T2910 | 0.1 | 0.1 | 23.0 | 0.45 | 2.4 | 0.41 | 51 | 5.9 |

[a] polyethyleneimine
[b] N—2-aminoethyl-3-aminopropyltrimethoxysilane
[c] N—2-aminoethyl-N—2-aminoethyl-3-aminopropyltrimethoxysilane As is apparent from the data in Table II, the membranes, particularly Examples 13-16, show an unusually high combination of high flux and high permeability. By comparison, typical $CO_2$ fluxes for commercial cellulose acetate asymmetric gas separation membranes are 5-10 SCFH/ft$^2$-100 psi, with $CO_2/CH_4$ selectivities of 20 to 30.

EXAMPLE 17

A large sheet of TFC membrane of the type described in Examples 13-16 was made using a machine that caused a 14-inch-wide sheet of microporous polymeric cellulose acetate support of the type used in Examples 9-16 to be first submerged in an 0.05 wt % hexane solution of the SAC compound for approximately 2 minutes, drained and air-dried for about 15 seconds, and then sprayed with a fine mist of an aqueous solution containing 0.05 wt % of the triamine T2910, 0.05 wt % surfactant of the type noted in Example 2, and 0.05 wt % pentamethylpropanediamine. Approximately 1.0 ml of aqueous spray was applied per square centimeter of membrane. The membrane was then air-dried and a 14×24-inch piece used to fabricate a spiral-wound module. The effective membrane surface area of the resulting module was about 900 to 950 cm². The module was tested in a manner similar to Example 2 except that the permeation rate of $H_2S$ at 10 psig and $H_2$ at 100 psig was tested in addition to $O_2$, $N_2$, $CO_2$ and $CH_4$. The results are shown in Table III.

TABLE III

| Flux (SCFH/ft²-100 psi) | | | | | | Selectivity | | | |
|---|---|---|---|---|---|---|---|---|---|
| $CO_2$ | $CH_4$ | $O_2$ | $N_2$ | $H_2$ | $H_2S$ | $CO_2/CH_4$ | $O_2/N_2$ | $H_2/CH_4$ | $H_2S/CH_4$ |
| 8.5 | 0.30 | 1.4 | 0.22 | 18.0 | 14.0 | 28 | 6.4 | 60 | 47 |

EXAMPLE 18

A comparative study of the stability and useful life of the membranes of the present invention was conducted. Membranes of the type described in Example 16 (TFC) were prepared and compared with commercial cellulose acetate gas separation membranes (CA) by exposing both types to 1000 psi nitrogen at 60°-80° C. for seven days. Performances of the membranes before and after the seven-day period are shown in Table IV.

TABLE IV

| Membrane | Initial Performance | | | Final Performance | | |
|---|---|---|---|---|---|---|
| | Gas Flux* | | Selectivity | Gas Flux* | | Selectivity |
| | $CO_2$ | $CH_4$ | $CO_2/CH_4$ | $CO_2$ | $CH_4$ | $CO_2/CH_4$ |
| TFC | 20 | .50 | 40 | 17 | .42 | 40 |
| CA | 15 | .38 | 40 | 5.6 | .15 | 37 |

*SCFH/ft²-100 psi

EXAMPLE 19

A temperature-dependent performance study of an exemplary membrane of the present invention was conducted in the following manner. A TFC membrane prepared as in Example 9 was tested for selectivity toward oxygen over nitrogen as in Example 2 at successive temperatures of 20° C., 60° C., and 80° C. Surprisingly, the $O_2/N_2$ selectivity increased slightly with increasing temperature from 3.5 to 3.7, which is contrary to what is expected. Results are shown in Table V.

TABLE V

| Temperature (°C.) | $O_2$ Flux (SCFH/ft²-100 psi) | Selectivity $O_2/N_2$ |
|---|---|---|
| 20 | 3.0 | 3.5 |
| 60 | 5.3 | 3.6 |
| 80 | 6.5 | 3.7 |

Thus, the efficiency of the membranes of the present invention is clearly indicated for separating gases, particularly oxygen from nitrogen, at above-ambient temperatures.

EXAMPLES 20-21

Two additional batches of the TFC membranes of the present invention were prepared and tested in essentially the same manner as in Examples 9-16 using as the actants (1) the alkoxysilanepolyamine T2910 at a concentration of 1.0 wt % and (2) the acid halides trimesoylchloride (TMC) and isophthaloyl chloride (IPC), both at 0.5 wt %. The results are shown in Table VI.

TABLE VI

| Ex. No. | Acid Chloride Reactant | Flux (SCFH/ft²-100 psi) | | | | Selectivity | |
|---|---|---|---|---|---|---|---|
| | | $CO_2$ | $CH_4$ | $O_2$ | $N_2$ | $CO_2/CH_2$ | $O_2/N_2$ |
| 19 | TMC | 1.0 | .023 | .13 | .025 | 43 | 5.2 |
| 20 | IPC | 3.6 | .077 | .41 | .079 | 47 | 5.2 |

EXAMPLE 22

In order to demonstrate the utility of the membranes of the present invention for removing water vapor from methane or humid air the following experiment was performed. Three TFC membranes were prepared in a manner similar to those of Examples 9-16 except that the microporous polymeric cellulose acetate supports used had pressure-normalized fluxes for $CO_2$ of about 340 SCFH/ft²-100 psi and $CO_2/CH_4$ selectivities of about 0.66. The two reactant solutions used to form the thin-film membrane by polycondensation were 2.0 wt % T2910 in water and 2.0 wt % SAC compound of Example 8 in hexane. The results of testing the three membranes as in Example 2 yielded the following average fluxes and standard deviations, all measured in SCFH/ft²-100 psi; $\alpha CH_4 = 1.9(0.6)$; $\alpha N_2 = 1.1(0.4)$; $\alpha O_2 = 3.7(0.5)$. The membranes were then each exposed to a humid air stream at a flow rate of 75 L/min, temperature of and a relative humidity of 35% at a pressure of 1 atmosphere. The downstream side of each membrane was maintained at a pressure of 1 cmHg. Under these conditions the average water and air flux and standard deviation through the membranes, measured in the same units as noted above, was 348(9) for water and 3.4(0) for air, yielding an $H_2O$/air selectivity of 102. The calculated $H_2O/CH_4$ selectivity was 183.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A semipermeable membrane comprising the polycondensation reaction product of two complementary polyfunctional compounds, at least one of which is selected from a group consisting essentially of siloxanes, alkoxysilanes, and aryloxysilanes, each of said complementary polyfunctional compounds having at least two functional groups selected from a member of Group A or Group B:

| Group A | Group B |
|---|---|
| —COX | —$NHR_h$ |
| —$SO_2X$ | —OH |
| —NCO | —SH |
| —$POXR_o$ | |
| —$NR_hCOX$ | | where X is halide; $R_o$ is selected from alkyloxy and substituted alkyloxy containing 1 to 18 carbons in the carbon chain, alkyl and substituted alkyl containing from 1 to 18 carbons in the carbon chain, cycloakyl, substituted cycloalkyl, and substituted heterocycloalkyl, aryl and substituted aryl; $R_h$ is selected from hydrogen and $R_o$; provided that when said at least two functional groups are selected from group A for one of said complementary polyfunctional compounds, said at least two functional groups are selected from group B for the other of said complementary polyfunctional compounds, and vice-versa; and further provided that when at least one of said complementary polyfunctional compounds is a siloxane and the functional group from group A is —NCO, the functional group from group B is not —$NHR_h$.

2. The membrane of claim 1 wherein the polycondensation is by interfacial polymerization.

3. The membrane of claim 1 wherein the Group A at least two functional groups are —COX and the Group B at least two functional groups are —$NHR_h$.

4. The membrane of claim 1 wherein the Group A at least two functional groups are —COX and the Group B at least two functional groups are —OH.

5. The membrane of claim 1 wherein the Group A at least two functional groups are —NCO and the Group B at least two functional groups are —OH.

6. The membrane of claim 1 wherein at least one of said complementary polyfunctional compounds is a siloxane of the structure

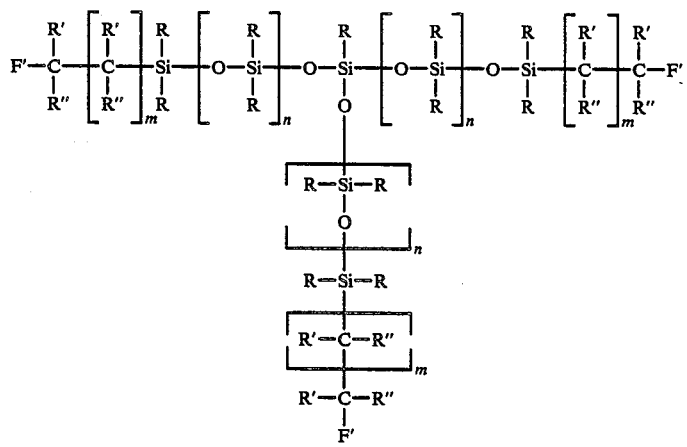

where F' is selected from members of Group A and Group B R is lower alkyl, halogen-substituted lower alkyl, and aryl; R' and R" are hydrogen or lower alkyl; and m and n are zero or integers up to 500.

7. The membrane of claim 6 wherein F' on one of said complementary polyfunctional compounds is an amine; F' on the other of said complementary polyfunctional compounds is —COX; m is 2 and n averages from 5 to 75.

8. The membrane of claim 7 wherein F' on the other of said complementary polyfunctional compounds is —OH.

9. The membrane of claim 1 wherein at least one of said complementary polyfunctional compounds is an alkoxysilyl or aryloxysilyl of the structure

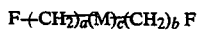

where F is selected from members of Group A or Group B; M is selected from Y or Z or combinations thereof; a and b are numbers selected from 0 and integers from 1 to 12; c is an integer from 1 to 20; Y is of the structure

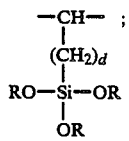

Z is of the structure

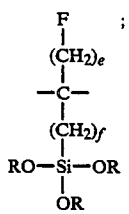

R is aryl or alkyl containing up to 10 carbon atoms; and d, e, and f are numbers selected from 0 and integers from 1 to 12.

10. The membrane of claim 1 wherein at least one of said complementary polyfunctional compounds is an alkoxysilyl or aryloxysilyl of the structure

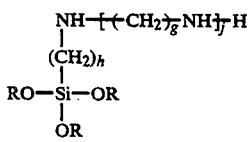

where R is aryl or alkyl containing up to 10 carbon atoms; g and h are numbers selected from 0 and integers from 1 to 12; and j is an integer from 1 to 20.

11. A thin-film composite separation membrane comprising a microporous polymeric support having a thin polymeric semipermeable film formed on the surface of said support, said film comprising the polycondensation reaction product of two complementary polyfunctional compounds, at least one of which is selected from a group consisting essentially of siloxanes, alkoxysilanes, and aryloxysilanes, each of said complelemtary polyfunctional compounds having at least two functional groups selected from a member of Group A or Group B:

| Group A | Group B |
|---------|---------|
| —COX | —NHR$_h$ |
| —SO$_2$X | —OH |
| —NCO | —SH |
| —POXR$_o$ | |
| —NR$_h$COX | | where X is halide; R$_o$ is selected from alkyloxy and substituted alkyloxy containing 1 to 18 carbons in the carbon chain, alkyl and substituted alkyl containing from 1 to 18 carbons in the carbon chain, cycloakyl, substituted cycloalkyl, and substituted heterocycloalkyl, aryl and substituted aryl; R$_h$ is selected from hydrogen and R$_o$; provided that when said at least two functional groups are selected from group A for one of said complementary polyfunctional compounds, said at least two functional groups are selected from group B for the other of said complementary polyfunctional compounds, and vice-versa; and further provided that when at least one of said complementary polyfunctional compounds is a siloxane and the functional group from group A is —NCO, the functional group from group B is not —NHR$_h$.

12. The thin-film composite membrane of claim 11 wherein the polycondensation is by interfacial polymerization.

13. The thin-film composite membrane of claim 11 wherein the Group A at least two functional groups are —COX and the Group B at least two functional groups are —NHR$_h$.

14. The thin-film composite membrane of claim 11 wherein the Group A at least two functional groups are —COX and the Group B at least two functional groups are —OH.

15. The thin-film composite membrane of claim 11 wherein the Group A at least two functional groups are —NCO and the Group B at least two functional groups are —OH.

16. The thin-film composite membrane of claim 11 wherein said support is selected from the group consisting essentially of polyethylene, polypropylene, polytetrafluoroethylene, cellulose acetate, cellulose triacetate, cellulose butyrate, regenerated cellulose, polysulfone, polyethersulfone, polyamide, polyetheramide, and polyvinylidene fluoride, one of said complementary polyfunctional compounds is of the formula

where R$_1$ is selected from alkylene, substituted alkylene, cycloalkylene, substituted cycloalkylene, arylene, substituted arylene, heterocycloalkylene and substituted heterocycloalkylene;

and the other of said complementary polyfunctional compounds is a siloxane of the structure

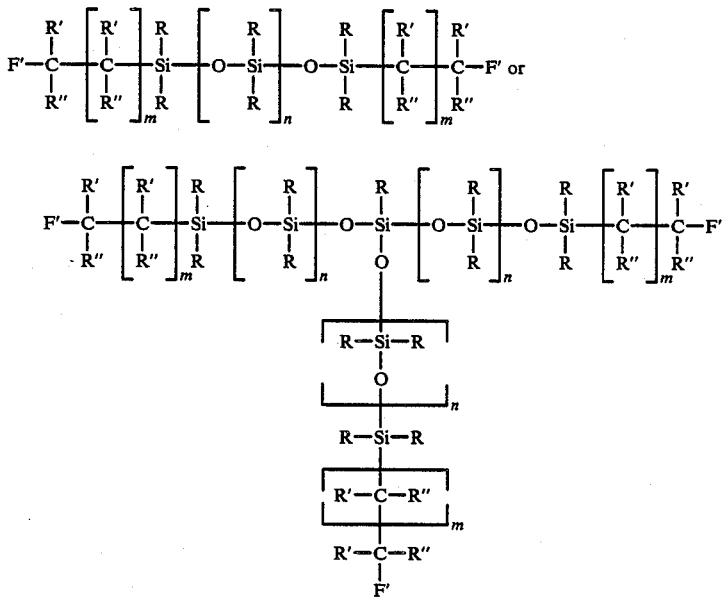

where F and F' are selected from members of Group A and Group B; R is lower alkyl, halogen-substituted lower alkyl, and aryl; R' and R" are hydrogen or lower alkyl; and m and n are zero or integers up to 500.

17. The thin-film composite membrane of claim 16 wherein F is an amine, F' is selected from —COX and —NCO, m is 2 and n averages from 5 to 75.

18. The thin-film composite membrane of claim 17 wherein F is —OH.

19. The thin-film composite membrane of claim 11 wherein the support is selected from sheets and hollow fibers.

20. The thin-film composite separation membrane of claim 11 wherein at least one of said complementary polyfunctional compounds is an alkoxysilyl or aryloxysilyl of the structure

where F is selected from members of Group A or Group B; M is selected from Y or Z or combinations thereof; a and b are numbers selected from 0 and integers from 1 to 12; c is an integer from 1 to 20; Y is of the structure

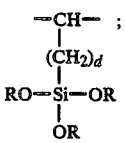

Z is of the structure

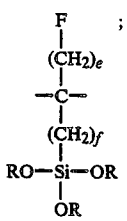

R is aryl or alkyl containing up to 10 carbon atoms; and d, e, and f are numbers selected from 0 and integers from 1 to 12.

21. The thin-film composite separation membrane of claim 11 wherein at least one of said complementary polyfunctional compounds is an alkoxy-silyl or aryloxy-silyl of the structure

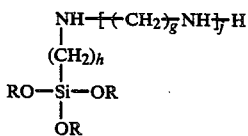

where R is aryl or alkyl containing up to 10 carbon atoms; g and h are numbers selected from 0 and integers from 1 to 12; and j is an integer from 1 to 20.

22. A method for the separation of oxygen and nitrogen comprising splitting a feed stream containing oxygen and nitrogen with the thin-film composite separation membrane of claims 11, 15, 20, or 21 into an oxygen-rich permeate stream and a nitrogen-rich residue 23. A method for the separation of hydrogen and nitrogen comprising splitting a feed stream containing hydrogen and nitrogen with the thin-film composite separation membrane of claims 11, 15, 20 or 21 into an hydrogen-rich permeate stream and a nitrogen-rich residue stream.

24. A method for the separation of carbon dioxide and a hydrocarbon mixture comprising alkanes and alkenes containing one to four carbon atoms, the method comprising splitting a feed gas stream containing carbon dioxide and said hydrocarbon mixture with the thin-film composite separation membrane of claims 11, 15, 20 or 21 into a carbon dioxide-rich permeate stream and a hydrocarbon mixture-rich residue stream.

25. The method of claim 24 wherein said hydrocarbon mixture is predominantly methane.

26. A method for the separation of hydrogen and a hydrocarbon mixture comprising alkanes and alkenes containing one to four carbon atoms, the method comprising splitting a feed stream containing hydrogen and said hydrocarbon mixture with the thin-film composite separation membrane of claims 11, 15, 20 or 21 into a hydrogen-rich permeate stream and a hydrocarbon mixture-rich residue stream.

27. The method of claim 26 wherein said hydrocarbon mixture is predominantly methane.

28. A method for the separation of hydrogen sulfide and a hydrocarbon mixture comprising alkanes and alkenes containing one to four carbon atoms, the method comprising splitting a feed stream containing hydrogen sulfide and said hydrocarbon mixture with the thin-film composite separation membrane of claims 11, 15, 20 or 21 into a hydrogen sulfide-rich permeate stream and a hydrocarbon mixture-rich residue stream.

29. The method of claim 28 wherein said hydrocarbon mixture is predominantly methane.

30. A method for the separation of water vapor and a gas comprising splitting a gaseous feed stream containing water vapor with the thin-film composite separation membrane of claims 11, 15, 20 or 21 into a water vapor-rich permeate stream and a water vapor-poor residue stream.

31. The method of claim 30 wherein said gaseous feed stream comprises air.

32. The method of claim 30 wherein said gaseous feed stream comprises methane.

* * * * *